United States Patent
Haba (10) Patent No.: US 10,508,446 B2
(45) Date of Patent: Dec. 17, 2019

(54) BRIDGE CLIP

(71) Applicant: Telling Industries, LLC, Willoughby, OH (US)

(72) Inventor: Charles Andrew Haba, Kirtland, OH (US)

(73) Assignee: Telling Industries, LLC, Willoughby, OH (US)

( * ) Notice: Subject to any disclaimer, the term of this patent is extended or adjusted under 35 U.S.C. 154(b) by 28 days.

(21) Appl. No.: 15/987,403

(22) Filed: May 23, 2018

(65) Prior Publication Data

US 2018/0266109 A1 Sep. 20, 2018

Related U.S. Application Data

(60) Provisional application No. 62/663,481, filed on Apr. 27, 2018, provisional application No. 62/663,431, (Continued)

(51) Int. Cl.
*E04C 3/07* (2006.01)
*E04B 2/58* (2006.01)
(Continued)

(52) U.S. Cl.
CPC ............... *E04C 3/07* (2013.01); *E04B 1/40* (2013.01); *E04B 2/58* (2013.01); *E04B 2/763* (2013.01); *E04B 2/789* (2013.01); *E04C 3/32* (2013.01); *F16B 5/0096* (2013.01); *F16B 7/0453* (2013.01); *F16M 13/02* (2013.01); *E04B 2001/405* (2013.01); *E04B 2002/7488* (2013.01); *E04B 2103/06* (2013.01);
(Continued)

(58) Field of Classification Search
CPC .......... E04B 2/58; E04B 2/763; E04B 2/7457; E04B 2/789; E04C 3/07; E04C 2003/0473; E04C 2003/026; Y10T 403/7073; Y10T 428/1241
See application file for complete search history.

(56) References Cited

U.S. PATENT DOCUMENTS 3,083,794 A * 4/1963 Stovall, Jr. ............... E04B 2/62
52/364
3,322,447 A * 5/1967 Biggs ..................... E04B 2/763
403/252

(Continued)

FOREIGN PATENT DOCUMENTS

JP 11141026 * 5/1999

*Primary Examiner* — Jessie T Fonseca
(74) *Attorney, Agent, or Firm* — Edwin A. Sisson, Attorney at Law, LLC; Jeffrey J. Banyas (57) ABSTRACT

It is described herein a bridge clip comprising a web, a first flange, and a second flange. The web having a web first edge substantially parallel to a web axis, and a web second edge substantially parallel to the web axis. The first flange extends from the web first edge while the second flange extends from the web second edge. Each of the flanges comprises a tab having a vertical tab having a vertical tab face in a vertical tab plane substantially perpendicular to the web axis and oriented in a vertical tab face direction substantially parallel to the web axis. The first vertical tab face direction opposes the second vertical tab face direction. It is also described that there is a positive distance value between the first vertical tab face and the second vertical tab face.

16 Claims, 5 Drawing Sheets

Related U.S. Application Data filed on Apr. 27, 2018, provisional application No. 62/662,839, filed on Apr. 26, 2018, provisional application No. 62/645,223, filed on Mar. 20, 2018, provisional application No. 62/644,050, filed on Mar. 16, 2018, provisional application No. 62/643,925, filed on Mar. 16, 2018.

(51) Int. Cl.

| | | |
|---|---|---|
| *E04B 2/76* | (2006.01) | |
| *E04B 2/78* | (2006.01) | |
| *E04B 1/41* | (2006.01) | |
| *F16B 5/00* | (2006.01) | |
| *F16M 13/02* | (2006.01) | |
| *E04C 3/32* | (2006.01) | |
| *F16B 7/04* | (2006.01) | |
| *E04C 3/04* | (2006.01) | |
| *E04C 3/02* | (2006.01) | |
| *E04B 1/38* | (2006.01) | |
| *E04B 2/74* | (2006.01) | |
| *F16B 5/02* | (2006.01) | |

(52) U.S. Cl.
CPC .............. *E04C 2003/026* (2013.01); *E04C 2003/0473* (2013.01); *F16B 5/02* (2013.01)

(56) References Cited

U.S. PATENT DOCUMENTS

| | | | | |
|---|---|---|---|---|
| 3,461,638 A * | 8/1969 | Balinski | ............. | E04B 2/789 52/238.1 |
| 3,854,192 A * | 12/1974 | O'Konski | ............. | B23K 37/04 228/135 |
| 3,904,162 A * | 9/1975 | O'Konski | ............. | B23K 37/04 248/222.52 |
| 5,189,857 A * | 3/1993 | Herren | ............. | E04B 2/58 52/317 |
| 5,287,664 A * | 2/1994 | Schiller | ............. | E04B 2/7457 248/56 |
| 5,606,837 A * | 3/1997 | Holizlander | ............. | E04C 3/02 52/639 |
| 5,784,850 A * | 7/1998 | Elderson | ............. | E04B 2/789 403/375 |
| 5,943,838 A * | 8/1999 | Madsen | ............. | E04B 2/7457 52/481.1 |
| 5,964,071 A * | 10/1999 | Sato | ............. | E04B 2/7457 403/316 |
| 6,209,268 B1 * | 4/2001 | Schmidt | ............. | E04B 1/2608 52/665 |
| 6,295,781 B1 * | 10/2001 | Thompson | ............. | E04B 1/2608 403/232.1 |
| D463,575 S * | 9/2002 | Daudet | ............. | D25/61 |
| D558,039 S * | 12/2007 | Skinner | ............. | D8/354 |
| 7,836,657 B1 * | 11/2010 | diGirolamo | ............. | E04B 2/765 52/317 |
| 8,205,402 B1 * | 6/2012 | diGirolamo | ............. | E04B 2/765 52/241 |
| 8,356,453 B2 | 1/2013 | Rice | | |
| D692,746 S * | 11/2013 | Lawson | ............. | E04B 2/763 D8/394 |
| 8,813,456 B2 | 8/2014 | Lin et al. | | |
| 9,016,024 B1 * | 4/2015 | Daudet | ............. | E04B 2/763 52/643 |
| 9,091,056 B2 * | 7/2015 | Stauffer | ............. | E04B 1/40 |
| 9,109,361 B2 | 8/2015 | Daudet et al. | | |
| 9,523,196 B2 * | 12/2016 | Rice | ............. | E04B 2/62 |
| 9,849,497 B2 | 12/2017 | Daudet et al. | | |
| 2003/0106280 A1 * | 6/2003 | diGirolamo | ............. | E04B 2/7457 52/656.1 |
| 2004/0031224 A1 * | 2/2004 | Elderson | ............. | E04B 2/7457 52/481.1 |
| 2007/0261805 A1 * | 11/2007 | Huang | ............. | E04B 2/7457 160/371 |
| 2013/0247499 A1 * | 9/2013 | Zimmerman | ............. | E04B 1/2608 52/582.1 |
| 2014/0270916 A1 * | 9/2014 | Daudet | ............. | E04B 2/763 403/188 |
| 2014/0270923 A1 * | 9/2014 | Daudet | ............. | E04B 2/763 403/286 |
| 2015/0033662 A1 * | 2/2015 | Daudet | ............. | E04C 3/07 52/696 |
| 2016/0060865 A1 * | 3/2016 | Lee | ............. | E04B 2/30 52/483.1 |
| 2017/0191254 A1 * | 7/2017 | Daudet | ............. | E04B 2/763 |
| 2017/0284090 A1 * | 10/2017 | LeBlang | ............. | E04B 2/707 |

\* cited by examiner

BRIDGE CLIP

CROSS REFERENCES AND PRIORITIES

This application claims the benefit of priority of United States Provisional Application Nos. 62/643,925 filed on 16 Mar. 2018, 62/644,050 filed on 16 Mar. 2018, 62/645,223 filed on 20 Mar. 2018; 62/663,481 filed on 27 Apr. 2018; 62/663,431 filed on 27 Apr. 2018 and 62/662,839 filed on 26 Apr. 2018; the teachings of which are incorporated in their entirety.

BACKGROUND

When building a wall with any stud, whether wood or steel, it is necessary to ensure that sequential studs are held in fixed positions relative to each other and also that they do not tend to twist or move laterally. In wood-stud walls, a short wood piece is typically nailed in place between adjacent studs to stabilize each of the studs. In steel stud walls, a bridge having a channel, also known as a bridging member, is typically inserted horizontally through a pre-punched opening in each of the vertically disposed studs to keep the studs aligned. Since a steel stud has relatively good columnar strength when straight, but loses a significant portion of this strength if twisted, the bridge is made to fit the punched opening with small tolerances to minimize twisting of the stud. In addition to mechanical twisting, studs can twist or bend from the heat of a fire once the wall-surface drywall sheet has been destroyed. When the studs twist or bend, they effectively lose their ability to support weight, adding to the damage caused to the building from the fire.

While such a bridge keeps the studs from twisting, it is not adequate to keep the studs from shifting or bending in a direction parallel to the wall being built. A simple right angle sheet metal bracket has been available to prevent this bending or shifting, although its installation is comparatively labor intensive. A user places the bracket with one section on top of the horizontal bridge channel and the other section against a stud. Screws are inserted through the holes in each section to affix the bracket to the stud and the channel. The bracket relies on the screws to accomplish its task, and relies on the installer for correct positioning.

U.S. Pat. No. 5,904,023 (the "023 Patent") discloses a bridge clip which has a first portion which straddles the linear channel member and a second portion perpendicularly connected to the first portion. In a first embodiment, the clip of the invention disclosed in the '023 patent has a front plate for engaging a front surface of the stud and a rear plate connected to the front plate by a bridge and adapted for engaging a rear surface of the stud. The bridge passes through the opening in the stud. Holes are provided in each portion for the insertion of anchoring fasteners. In a second embodiment disclosed in the '023 patent, the clip includes the straddle portion which is perpendicularly connected to a planar portion adapted for engaging the front surface of the stud with no part contacting the rear surface. The clip of the second embodiment disclosed in the '023 patent is fastened to the channel member and the stud. The invention described in the '023 patent further provides a third embodiment having a front plate and a rear plate which are each formed with a stiffening rib and having a portion formed by drawing a pair of depending legs in a saddle plate for straddling the linear channel. This third embodiment in the '023 patent allows the use of a lighter gage metal sheet without a significant loss of stiffness.

Examination of the drawings in the '023 patent shows that the channel is pointed downward and the bridge clip is unusable for a channel designed to face upward.

U.S. Pat. Nos. 8,356,453, 8,813,456, and 9,016,024 all disclose bridge clips, but, like the '023 patent, in each case the channel is pointed downward making the bridge clip unusable for an upward facing channel.

There exists therefore a need for a bridge clip which can be used where the channel of the bridge is facing upward so that the channel of the bridge can be used for holding cabling and electrical wires.

SUMMARY

A special bridge clip nesting inside the channel of a bridge is disclosed. The bridge clip is comprised of a web having a web length and a web width (220) defining a web plane. There is a web axis in the direction of the web length. The web also has a web first edge substantially parallel to the web axis and a web second edge substantially parallel to the web axis. The a first flange (300), extending from the web first edge and substantially perpendicular to the web plane having a first tab with a first vertical tab having a first vertical tab face in a first vertical tab plane, with the first vertical tab plane substantially perpendicular to the web axis and oriented in a first vertical tab face direction which substantially parallel to the web axis. There is also a second flange extending from the web second edge and substantially perpendicular to the web plane.

It is further disclosed that the bridge may further comprise a second tab with a second vertical tab having a second vertical tab face in a second vertical tab plane substantially perpendicular to the web axis and oriented in a second vertical tab face direction which is substantially parallel to the web axis and opposing the first vertical tab face direction and that there is a distance value between the first vertical tab face and the second vertical tab face measured along the web axis with the distance value being a positive real number.

The bridge clip may further comprising a first tab support (350) extending from the first flange to the first vertical tab and/or a second tab support (450) extending from the second flange to the second vertical tab.

It is also disclosed that the first vertical tab may comprises a first vertical tab flare and that, if present, the second vertical tab may comprise a second vertical tab flare.

One or both of the first and second vertical tabs may each comprises at least one vertical tab hole passing from the vertical tab face through the respective vertical tab plane.

The web may also comprise at least one web hole passing through the web plane. Additionally, the web may comprise at least one web weep hole passing through the web plane.

It is also disclosed that the second tab may be an end bridge clip tab with an end bridge clip vertical tab having an end bridge clip vertical tab face in an end bridge clip vertical tab plane which is the same plane as the first vertical tab plane and substantially perpendicular to the web axis with the end bridge clip vertical tab oriented in an end bridge clip vertical tab face direction which is substantially parallel to the web axis and facing the same direction as the first vertical tab face direction.

The bridge clip with the end bridge clip tab may have a first tab support extending from the first flange to the first vertical tab and/or an end bridge clip tab support extending from the second flange to the end bridge clip vertical tab.

Either vertical tab of the end bridge clip may have at least one vertical tab hole passing from the vertical tab face through the vertical tab plane.

The bridge clip may be nested into a channel of a bridge with the bridge clip fastened to the bridge, and the bridge clip fastened to a stud.

DETAILED DESCRIPTION

Figure 1:
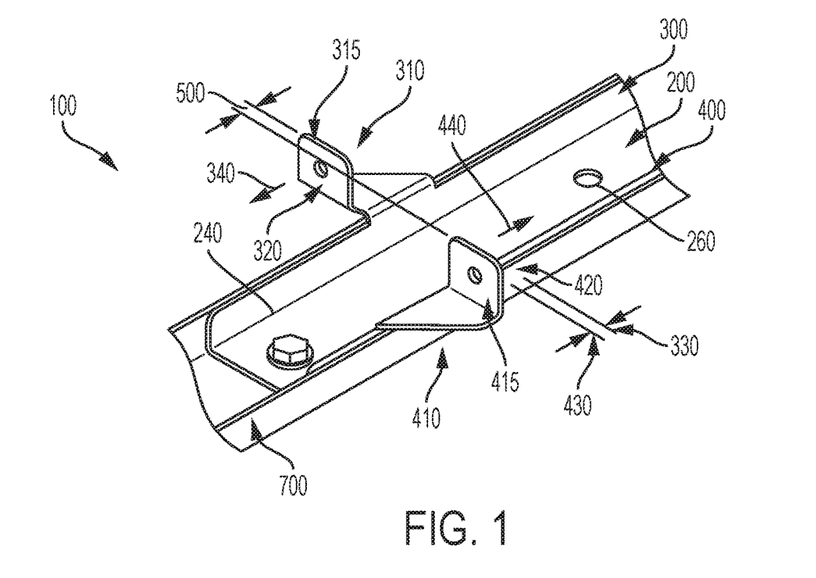
FIG. 1 is a perspective view of the bridge clip inserted into and attached to a bridge.

This specification is best understood by referring to FIG. 1 which is a detailed drawing of the invented bridge clip. Reference will now be made to the various Figures in which, unless otherwise noted, like numbers refer to like structures. As described herein and in the claims, the following numbers refer to the following structures as noted in the Figures.

100 refers to the bridge clip.
200 refers to the web.
210 refers to the web length.
220 refers to the web width.
230 refers to the web axis.
240 refers to the web first edge.
250 refers to the web second edge.
260 refers to the web hole.
270 refers to the web weep hole.
300 refers to the first flange.
310 refers to the first tab.
315 refers to the first vertical tab.
320 refers to the first vertical tab face.
330 refers to the first vertical tab plane.
340 refers to the first vertical tab face direction.
350 refers to the first tab support.
360 refers to the first vertical tab hole(s).
370 refers to the first vertical tab outward curve.
375 refers to the first vertical tab flare.
400 refers to the second flange.
410 refers to the second tab.
415 refers to the second vertical tab.
420 refers to the second vertical tab face.
430 refers to the second vertical tab plane.
440 refers to the second vertical tab face direction.
450 refers to the second tab support.
460 refers to the second vertical tab hole(s).
470 refers to the second vertical tab outward curve.
475 refers to the second vertical tab flare.
500 refers to the distance value between the first vertical tab face and the second vertical tab face.
610 refers to the end bridge clip tab.
615 refers to the end bridge clip vertical tab.
620 refers to the end bridge clip vertical tab face.
640 refers to the end bridge clip vertical tab face direction.
650 refers to the end bridge clip tab support.
700 refers to a channel of a bridge.
800 refers to the stud(s).
810 refers to an opening in a stud.
900 refers to the vertical tab fastener(s).
910 refers to the web fastener(s).

FIG. 1 depicts the bridge clip (100) affixed to a channel of a bridge (700). The bridge clip comprises a web (200), a first flange (300), and a second flange (400).

The web also has a web first edge (240) and a web second edge (250, shown in FIG. 2) both in the direction of the web length.

The first flange (300) extends from the web first edge (240) at a juncture between the web first edge and the first flange. The first flange comprises a first tab (310) having a first vertical tab (315) and first vertical tab face (320) in a first vertical tab plane (330) and facing a first vertical tab face direction (340).

The second flange (400) extends from the web second edge (250) at a juncture between the web second edge and the second flange. The second flange comprises a second tab (410) having a second vertical tab (415) and a second vertical tab face (420) in a second vertical tab plane (430) and facing a second vertical tab face direction (440).

The juncture between the web first edge and the first flange; and the juncture between the web second edge and the second flange could be a weld, glue, epoxy, or a bend. It is not required that both juncture be the same type of juncture. For instance, the juncture between the web first edge and the first flange may be a bend while the juncture between the web second edge and the second flange may be a weld. The preferred juncture for both is a bend so that the web and the flanges may be of a unitary construction. That is, the web and the flanges may be made from the same piece of material. The material of construction is preferably a metal. Examples of such metal include steel, stainless steel, iron, aluminum, copper, brass, titanium, and the like.

As shown in FIG. 1, the web may also comprise at least one web hole (260) passing through the web plane. The web hole(s) provide a location at which a fastener, such as a screw or a bolt, can pass through the web and then through a hole in the bridge to affix the bridge clip to the bridge.

Figure 2:
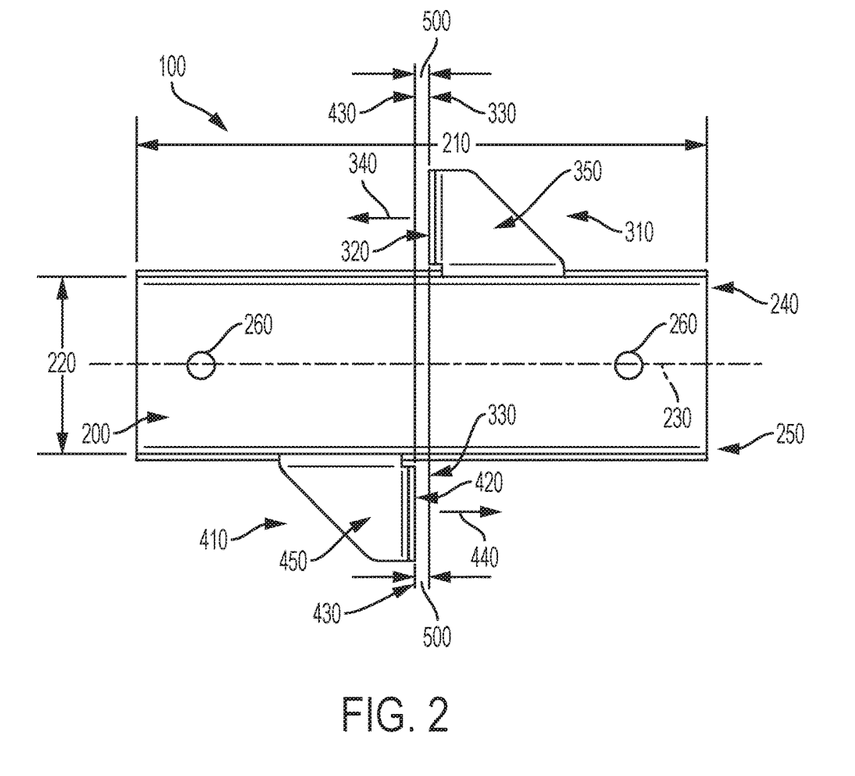
FIG. 2 is a top view of the bridge clip.

FIG. 2 depicts a top view of the bridge clip (100). As shown in FIG. 2, the web (200) has a web length (210) and a web width (220) defining a horizontal plane with a web axis (230) in the direction of the web length. Preferably, the web first edge and the web second edge are parallel to or substantially parallel to each another. Preferably, the web first edge and the web second edge are also parallel to or substantially parallel to the web axis.

The first flange (300) extends from the web first edge (240) and perpendicular or substantially perpendicular to the horizontal plane. Similarly, the second flange (400) extends from the web second edge (250) and perpendicular or substantially perpendicular to the horizontal plane.

The first vertical tab plane (330) may be perpendicular or substantially perpendicular to the web axis (230) while the first vertical tab face direction (340) may be parallel to or substantially parallel to the web axis. Similarly, the second vertical tab plane (430) may be perpendicular or substantially perpendicular to the web axis while the second vertical tab face direction (440) may be parallel to or substantially parallel to the web axis.

As shown in the embodiment in FIG. 2, the first vertical tab face (320) and the second vertical tab face (420) may face opposing directions. In other words, the first vertical tab face direction (340) is opposite of the second vertical tab face direction (440). There may also be a distance value (500) between the first vertical tab face and the second vertical tab face. The distance value between the first vertical tab face and the second vertical tab face is measured along the web axis (230), and is a positive real number. Preferably, the distance value between the first vertical tab face and the second vertical tab face is slightly greater than the thickness of the stud gauge to which the bridge clip is to be affixed. For example, if the thickness of the stud gauge is 5 mm, the distance value between the first vertical tab face and the second vertical tab face may be greater than 5 mm. The best results are expected when the distance value between the first vertical tab face and the second vertical tab face is greater than the thickness of the stud gauge, but as close as possible to the thickness of the stud gauge resulting in a close tolerance which will reduce or prevent twisting or bending.

As further shown in the embodiment of FIG. 2, there may also be a first tab support (350) extending from the first flange (300) to the first vertical tab (315). Similarly, there may also be a second tab support (450) extending from the second flange (400) to the second vertical tab (415). The vertical tab supports, when present, provide additional strength to the bridge clip.

Figure 3:
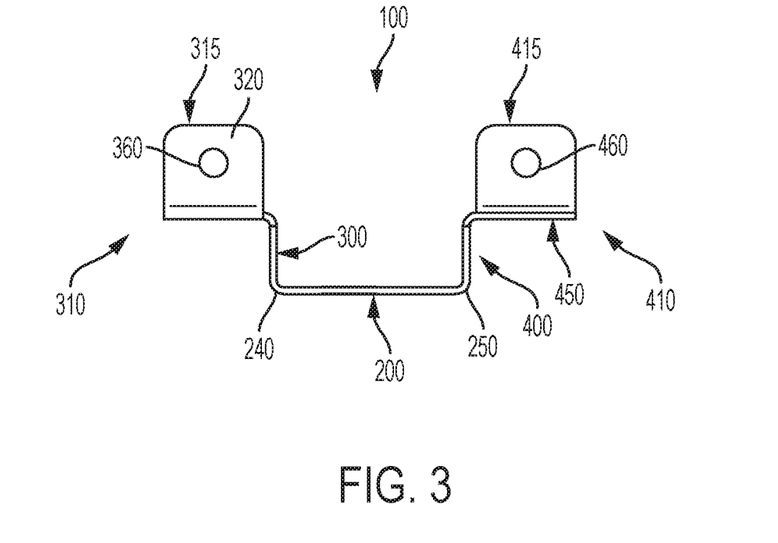
FIG. 3 is an end view of the bridge clip.

FIG. 3 shows an end view of the bridge clip (100). As shown in FIG. 3, the first vertical tab (315) may comprise at least one first vertical tab hole (360) passing from the first vertical tab face (320) through the first vertical tab plane. The first vertical tab hole(s) provide a location at which a fastener, such as a screw or a bolt, can pass through the first vertical tab and then through a hole in the stud to affix the bridge clip to the stud.

As shown in FIG. 3, the second vertical tab (415) may comprise at least one second vertical tab hole (460) passing from the second vertical tab face through the second vertical tab plane. The second vertical tab hole(s) provide a location at which a fastener, such as a screw or a bolt, can pass through the second vertical tab and then through a hole in the stud to affix the bridge clip to the stud.

Figure 4:
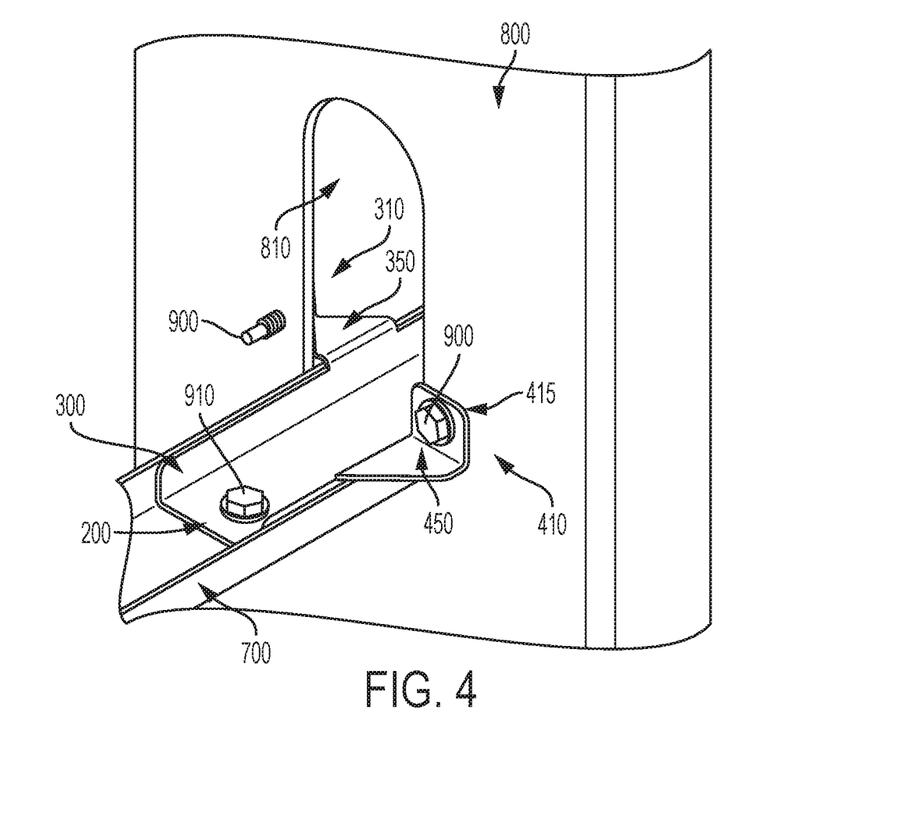
FIG. 4 is a perspective view of the bridge clip nested in a channel of a bridge and attached to a stud.

FIG. 4 shows a perspective view of the bridge clip (100) nested in and fastened to a channel of a bridge (700) and fastened to a stud (800). To install the bridge clip, the clip is rotated 90° on the web axis from the position shown in FIG. 4. The bridge clip is then placed through the opening in the stud (810). The bridge clip is then rotated back 90° on the web axis with the wall of the stud in between the each of the vertical tab faces, and the channel of the bridge formed by the web (200) and the two flanges (300, 400) pointing upwards. It should be readily apparent that the channel can also face downwards by reversing the orientation of the bridge clip.

FIG. 4 also shows vertical tab fasteners (900) extending through the first vertical tab hole and the second vertical tab hole and corresponding holes in the stud to affix the bridge clip to the stud. Similarly, FIG. 4 shows a web fastener (910) extending through a web hole and a corresponding hole in the channel of the bridge to affix the bridge clip to the bridge.

Figure 5A:
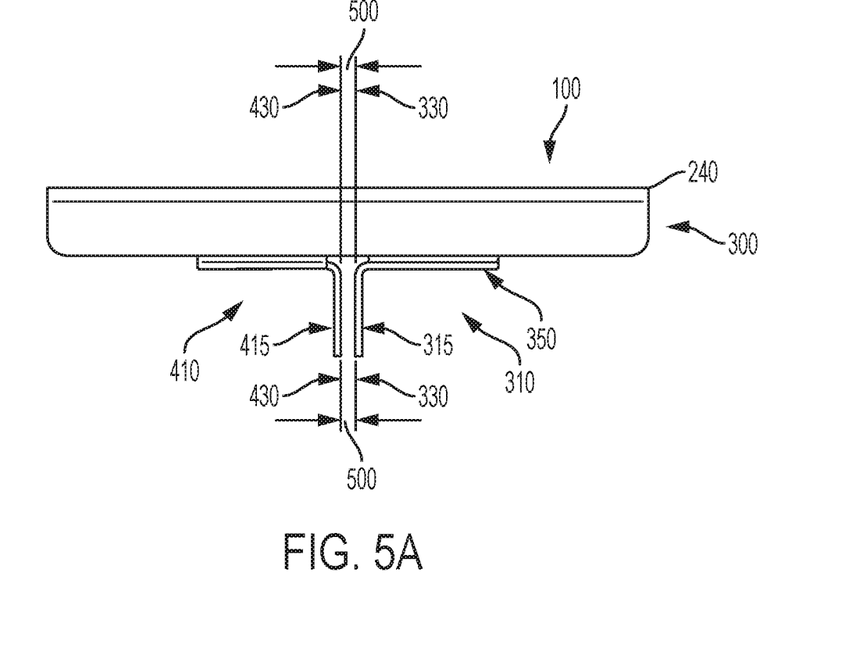
FIG. 5A is a side view of an embodiment of the bridge clip.

FIG. 5A shows a side view of one embodiment of the bridge clip (100) further illustrating the distance value (500) between the first vertical tab face and the second vertical tab face.

Figure 5B:
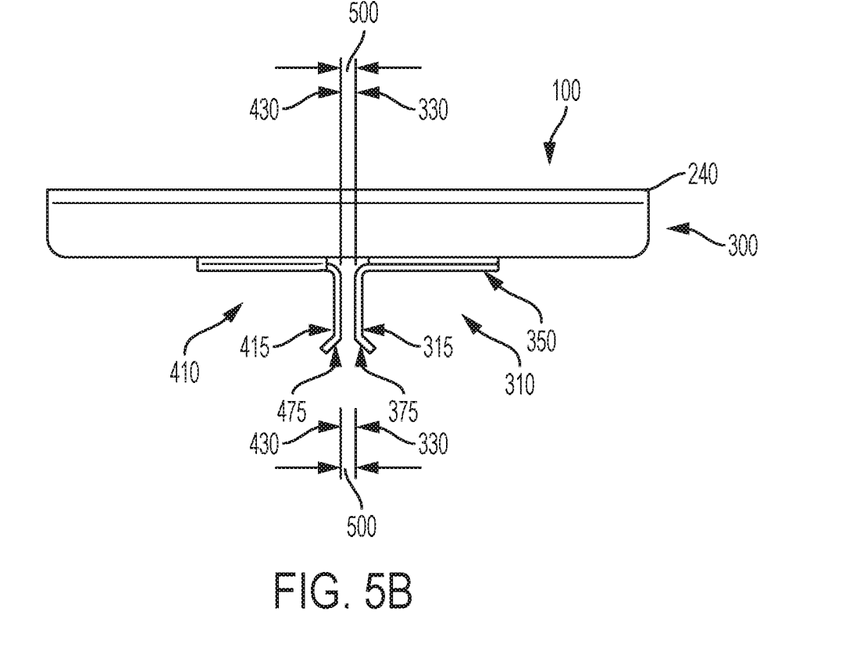
FIG. 5B is a side view of a different embodiment of the bridge clip.

FIG. 5B shows the side view of an embodiment where the vertical tabs are flared at the end, just past the tab holes. The flaring away from the planes (430) and (330) is shown as the first vertical tab flare (375) and second vertical tab flare (475). These flares provide a lead-in to create the snug fit as the bridge clip is inserted into the stud hole and then twisted so that the stud is engaged between each vertical tab.

Figure 6:
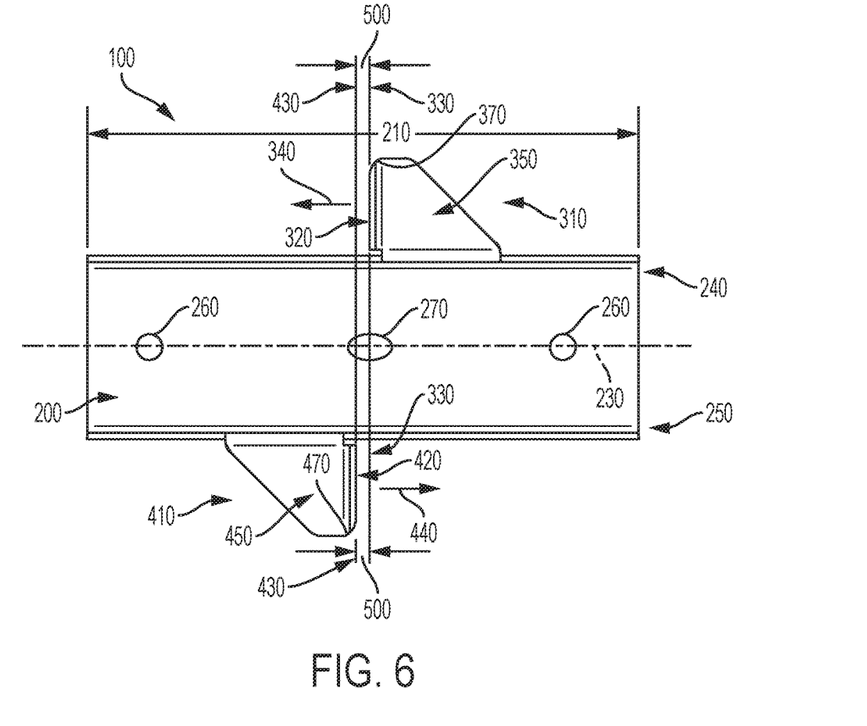
FIG. 6 is a top view of an embodiment of the bridge clip.

FIG. 6 shows a top view of a bridge clip (100). As shown in FIG. 6, the bridge clip may also comprise at least one web weep hole (270) passing through the web plane. The web weep hole(s) may allow for water and other fluids to drain from the bridge clip during construction.

As also shown in FIG. 6, the first tab support (350) may comprise a first vertical tab outward curve (370). Similarly, the second tab support (450) may comprise a second vertical tab outward curve (470). The vertical tab outward curves provide easier installation by removing any requirement for an exact alignment with the opening in the stud when rotating the bridge clip as the stud will engage the wider curved portion, then engage the flares, and then twist into the distance value (500) between the first vertical tab face and the second vertical tab face.

Figure 7:
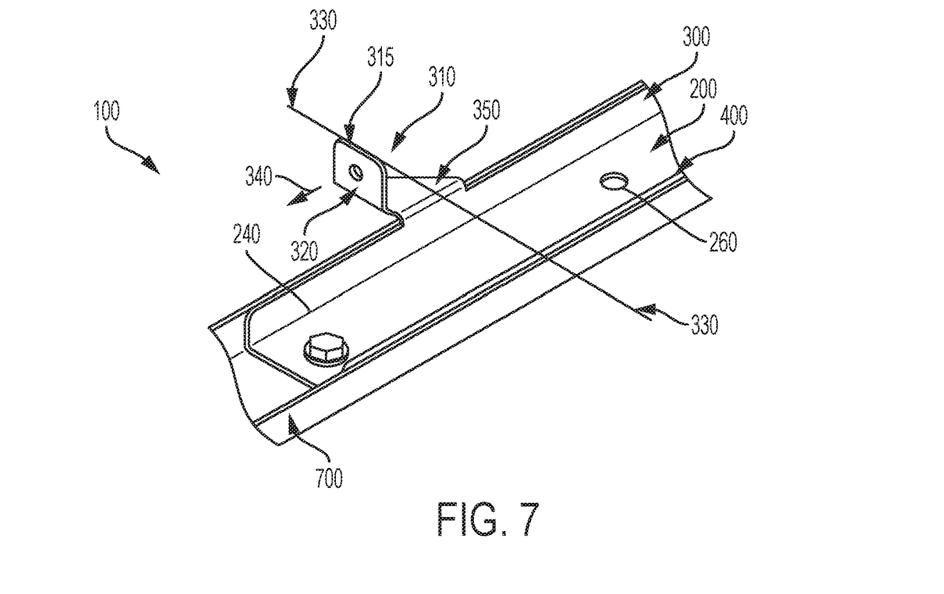
FIG. 7 is a perspective view of an embodiment of the bridge clip.

FIG. 7 shows an embodiment of the bridge clip with only one tab (310), one vertical tab (315), one vertical tab face (320), one vertical tab face direction (340), one (1) vertical tab plane (330), and one (1) tab support. This embodiment could be selected to save materials and easier installation if the strength of two tabs are not needed. While FIG. 7 shows an embodiment with only one tab corresponding to the first tab (300 series), one of ordinary skill will recognize that embodiments can exist where there is only one tab corresponding to the second tab (400 series).

Figure 8A:
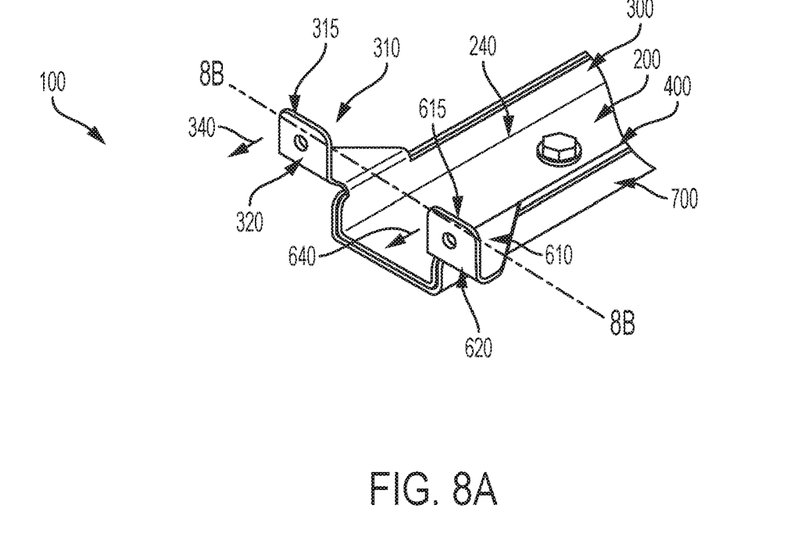
FIG. 8A is a perspective view of an embodiment of the bridge clip.
Figure 8B:
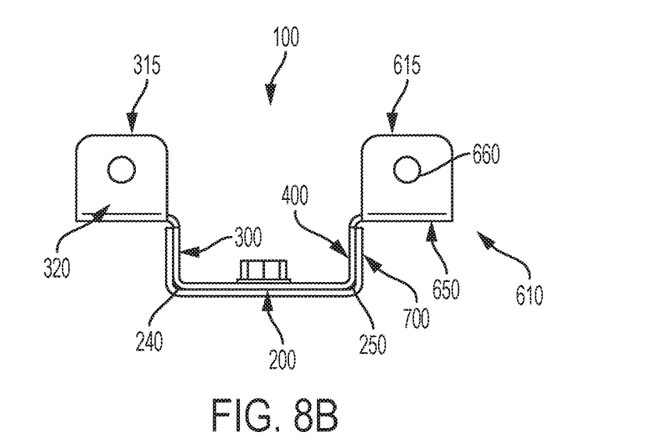
FIG. 8B is a front view of an embodiment of the bridge clip.
Figure 8C:
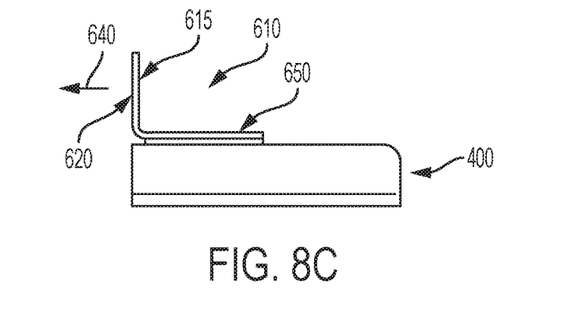
FIG. 8C is a side view of an embodiment of the bridge clip.

FIGS. 8A, 8B, and 8C are an embodiment of the bridge clip, called an end bridge clip or end clip. The end bridge clip is used when the bridge does not extend through the stud hole, or extends very little.

As shown in FIG. 8A, this embodiment has a first tab with all the first tab elements as described previously. It also has a end bridge clip tab (610) with an end bridge clip vertical tab (615), an end bridge clip vertical tab face (620), and an end bridge clip vertical tab face direction (640). The reason the 600 series is used is because the end bridge clip vertical tab face of this embodiment faces the same direction as the first vertical tab face. As shown in FIG. 8A, the first vertical tab face and the second vertical tab face are in the same tab plane (dashed line 8B). The vertical tab supports (350 and 650) are directly opposite each other.

As shown in FIG. 8B, there may be a second vertical tab hole (660).

FIG. 8C is the side view of the embodiment showing the elements of the second tab (610). Shown are the second vertical tab (615), the second vertical tab face (620), a second vertical tab face direction (640), and a second tab support (450).

One difference from the prior art is that the bridge clip nests inside the channel of the bridge where the prior art bridge clips lay around the outside of the channel. Accordingly, the bridge clip width is designed to be less than that of prior art clips which fit on the outside of the channel.

Put another way, the bridge clip nests in the channel of a horizontal bracing member. There are different types of horizontal bracing members, with CRC (cold rolled channel) being just one of them.

When the bridge clip is nested in the channel of a horizontal bracing member with the channel facing up, the channel can be used as a wiring trough as well. The optional weep holes drain off water that may enter the channel during construction before the wall is finished.

We claim:

1. A bridge clip (100) comprising:
   a web (200) having a web length (210) and a web width (220) defining a web plane with a web axis (230) in a direction of the web length, a web first edge (240) substantially parallel to the web axis, and a web second edge (250) substantially parallel to the web axis;
   a first flange (300), extending from the web first edge and substantially perpendicular to the web plane having a first tab (310) having a first vertical tab (315) having a first vertical tab face (320) in a first vertical tab plane (330) substantially perpendicular to the web axis and oriented in a first vertical tab face direction (340) substantially parallel to the web axis;
   a second flange (400), extending from the web second edge and substantially perpendicular to the web plane;
   an end bridge clip tab (610) having an end bridge clip vertical tab (615) having an end bridge clip vertical tab face (620) in an end bridge clip vertical tab plane (630) which is the same plane as the first vertical tab plane and substantially perpendicular to the web axis with the end bridge clip vertical tab oriented in an end bridge clip vertical tab face direction (640) substantially parallel to the web axis facing the same direction as the first vertical tab face direction;
   and
   the bridge clip does not have a second tab having a second vertical tab having second vertical tab face in a second vertical tab plane substantially perpendicular to the web axis and oriented in a second vertical tab face direction substantially parallel to the web axis and opposing the first vertical tab face direction; wherein there is a distance value between the first vertical tab face and the second vertical tab face measured along the web axis, and the distance value is a positive real number
   wherein the bridge clip is nested into a channel of a horizontal bracing member, the bridge clip is fastened to the horizontal bracing member, and the bridge clip is fastened to a stud.

2. The bridge clip of claim 1, wherein the first vertical tab comprises a first vertical tab flare (375).

3. The bridge clip of claim 1, wherein the end bridge clip tab comprises an end bridge clip tab flare.

4. The bridge clip of claim 1, wherein the first vertical tab comprises at least one first vertical tab hole passing from the first vertical tab face through the first vertical tab plane.

5. The bridge clip of claim 1, wherein the web comprises at least one web hole (260) passing through the web plane.

6. The bridge clip of claim 5, wherein the web comprises at least one web weep hole (270) passing through the web plane.

7. The bridge clip of claim 1, wherein the first vertical tab comprises at least one first vertical tab hole passing from the first vertical tab face through the first vertical tab plane or the end bridge clip vertical tab comprises at least one end bridge clip vertical tab hole passing from the end bridge clip vertical tab face through the end bridge clip vertical tab plane, or both.

8. The bridge clip of claim 1, wherein the web comprises at least one hole selected from the group consisting of a web hole (260) and a web weep hole (270) passing through the web plane.

9. A bridge clip (100) comprising:
   a web (200) having a web length (210) and a web width (220) defining a web plane with a web axis (230) in a direction of the web length, a web first edge (240) substantially parallel to the web axis, and a web second edge (250) substantially parallel to the web axis;
   a first flange (300), extending from the web first edge and substantially perpendicular to the web plane having a first tab (310) having a first vertical tab (315) having a first vertical tab face (320) in a first vertical tab plane (330) substantially perpendicular to the web axis and oriented in a first vertical tab face direction (340) substantially parallel to the web axis;
   a second flange (400), extending from the web second edge and substantially perpendicular to the web plane;
   an end bridge clip tab (610) having an end bridge clip vertical tab (615) having an end bridge clip vertical tab face (620) in an end bridge clip vertical tab plane (630) which is the same plane as the first vertical tab plane and substantially perpendicular to the web axis with the end bridge clip vertical tab oriented in an end bridge clip vertical tab face direction (640) substantially parallel to the web axis facing the same direction as the first vertical tab face direction;
   and
   the bridge clip does not have a second tab (410) having a second vertical tab (415) having second vertical tab face (420) in a second vertical tab plane (430) substantially perpendicular to the web axis and oriented in a second vertical tab face direction (440) substantially parallel to the web axis and opposing the first vertical tab face direction; wherein there is a distance value (500) between the first vertical tab face and the second vertical tab face measured along the web axis, and the distance value is a positive real number;
   wherein the bridge clip is nested into a channel of a bridge, the bridge clip is fastened to the bridge, and the bridge clip is fastened to a stud.

10. The bridge clip of claim 9, wherein the first vertical tab comprises a first vertical tab flare (375).

11. The bridge clip of claim 9, wherein the end bridge clip tab comprises an end bridge clip tab flare.

12. The bridge clip of claim 9, wherein the first vertical tab comprises at least one first vertical tab hole passing from the first vertical tab face through the first vertical tab plane.

13. The bridge clip of claim 9, wherein the web comprises at least one web hole (260) passing through the web plane.

14. The bridge clip of claim 13, wherein the web comprises at least one web weep hole (270) passing through the web plane.

15. The bridge clip of claim 9, wherein the first vertical tab comprises at least one first vertical tab hole passing from the first vertical tab face through the first vertical tab plane or the end bridge clip vertical tab comprises at least one end bridge clip vertical tab hole passing from the end bridge clip vertical tab face through the end bridge clip vertical tab plane, or both.

16. The bridge clip of claim 9, wherein the web comprises at least one hole selected from the group consisting of a web hole (260) and a web weep hole (270) passing through the web plane.

* * * * *